United States Patent Office.

JOHN CONZELMAN, OF ST. LOUIS, MISSOURI.

Letters Patent No. 105,916, dated August 2, 1870.

IMPROVED COUGH-SIRUP.

The Schedule referred to in these Letters Patent and making part of the same.

*To all whom it may concern:*

Be it known that I, JOHN CONZELMAN, of St. Louis, in the county of St. Louis and State of Missouri, have invented a new and useful Whooping-cough Sirup; and I do hereby declare the following to be a full and true description thereof in its ingredients and method of compounding and application.

The said sirup is to be used internally, for the special cure of whooping-cough, colds, and common coughs, although, generally, said sirup is also eminently efficacious for the cure of all bronchial affections, such as croup, asthma, pneumonia, and consumption, and is formed of the ingredients in the manner now more fully to be described.

I add to a pint of water one pound of white loaf (crushed) sugar and boil the mixture until, as a first ingredient, a simple sirup is formed.

I next take one scruple of cochineal (*cocionel la sept*), pulverize the same, and dissolve it with pure water. This second ingredient I mix well with the former sirup, and strain the mixture, in any proper manner, from all impurities.

I next take five grains of acetate of copper (*cuprum aceticum*), and dissolve said quantity, in a mortar or other proper vessel, with four drams of the tincture of ipecac (*tinctura ipecacuanhae*). Said mixture thus formed I then mix or unite in a thorough manner with the sirup compound.

To one dram of citric acid I add a few drops of water to dissolve the same, and then mix the solution also with the sirup.

The sirup thus prepared should be stirred for some time, until the mixture appears well united and dissolved, and, finally, I add to the same four drams phosphoric acid (*acidum phosphori*), at the same time stirring the sirup proper in a slow manner.

The application or use of my sirup should be as follows:

For a child one month old or less, (5) five to six (6) drops; three to six months old, eight (8) to ten (10) drops; one year old, twelve (12) to fifteen (15) drops; three years old, eighteen (18) to twenty (20) drops; five years or upward, half a teaspoonful; adults, a small teaspoonful.

The dose should be repeated every two (2) or three (3) hours, according to the violence of the symptoms, or as often as deemed necessary, until a cure is effected.

Claim.

Having thus fully described my said invention,

What I claim, and desire to secure by Letters Patent, is—

The manufacture or preparation of a medical compound composed, formed, and compounded of the ingredients substantially as set forth.

In testimony of said invention I have hereunto set my hand in presence of—

JOHN CONZELMAN.

Witnesses:
WILLIAM W. HERTHEL,
ROBERT BURNS.